Patented Apr. 18, 1933                                                         1,904,172

UNITED STATES PATENT OFFICE

HELIODOR ROSTIN, OF BERLIN, GERMANY

PROCESS FOR TREATING LOW BOILING HYDROCARBONS

No Drawing.                Application filed March 2, 1929. Serial No. 344,102.

This invention relates to the treatment of fluid carbon compounds and has for its object the provision of a novel method of altering the chemical and physical characteristics of such compounds and eliminating various objectionable properties thereof.

It is a further object of the invention to provide a process for improving fluid carbon compounds involving the use of a highly active substance which is so divided, distributed and mechanically supported as to offer a maximum of exposed surface for contact with the material undergoing treatment, and to provide an efficient and inexpensive method for producing such an active substance.

The process which comprises the present invention is intended for use in the treatment of fluid carbon compounds in general, either in the liquid or gaseous state, and is applicable to compounds having widely varying characteristics and in which it is desired to produce varying results.

For instance, the process may be used to effect the removal of organically combined sulphur from carbon compounds such as coal gas, mineral oils, or oils produced from coal, lignite, shale and similar materials, the reduction of the oxygen content thereof, or the replacement of the oxygen by hydrogen, as in the conversion of the carbon monoxide into liquid or gaseous hydrocarbons. The process is also found to be useful in the reduction of acid bodies, such as phenols or cresols, in oils.

Further important uses of the process described herein are the addition of hydrogen to carbon compounds, with or without the transposition of molecules, the condensation of gases, the liquefaction of naphthalin, and the transformation of hydrogen cyanide into ammonia.

The process which comprises the present invention is preferably carried out at a temperature of from 220° C. to 300° C. and consists in conducting the material to be treated, either in liquid, vapor, or gaseous form, over metallic ore. It has been found that iron ore is particularly effective for this purpose, although other metallic ores, such as copper or nickel, may be used. The pressure to which the material is subjected during the process depends largely on the condition of the material, liquid or gaseous, and on the result which is to be obtained, the process being carried out in some instances at atmospheric pressure, and under other conditions at varying pressures above atmospheric.

The metallic ore which forms the highly active substance is preferably first reduced, either partially or totally, by passing hydrogen or a hydrogen carrying gas through the same, with the result that the ore becomes pyrophorous and glows brightly on contact with oxygen, this phenomenon indicating the intensely active condition of the substance. The activity of metallic ore after treatment with hydrogen, particularly of iron ore, is of such unusual intensity as cannot be duplicated by the treatment of metals alone, even when incorporated in an artificial mixture with other substances. This activity is possibly due in part to the peculiar composition of the ore or to the inclusion in the ore of minute traces of certain substances; it is also doubtless due in part to the porous nature of the ore itself. For instance, iron ore after reduction by treatment with hydrogen, comprises a porous skeleton supporting structure on the surfaces of which finely divided iron is carried, so that the particles of the reduced iron are held in intimate contact with the associated gas or vapor so that the conditions for chemical reaction or catalysis are extremely favorable.

It is therefore advisable to select an ore for use in the process described herein which will be highly porous and which is composed largely of small nodules or is granulated, since the degree of contact between the metal in the ore and the surrounding gas is important to the successful commercial practice of the present invention. A metallic ore known as "minette" has been found to be particularly well suited for use in the process above mentioned. This ore is an oolitic limonite, the grains of limonite measuring approximately ¼–1 m. m. across and being cemented by calcite or ferruginous clay, the structure of the ore thus exihibiting the desirable porosity and granular character for insuring complete exposure of the reduced metal to the material being treated.

It has been found advisable to compress or pack the ore tightly into a container provided with suitable means for admitting and withdrawing the treated material, this container being conveniently formed as a tube through which the material in question may be passed. In order to prevent the formation of channels in the ore by prolonged passage of active material it is preferable to separate the ore into spaced layers by providing the container with a series of superimposed perforated trays or plates for supporting the several layers of ore in spaced relation.

The following specific examples will serve to illustrate the application of the process to the treatment of various fluid carbon compounds, the materials treated in the following examples being described generically by the term "low boiling hydrocarbons".

Tightly packed and granulated minette is heated to 300° C. and maintained at that temperature while a gas containing hydrogen is conducted through the ore for reducing the iron oxide contained therein. Coal gas or water gas from which the sulfuretted hydrogen has been removed is suitable for this purpose, the reaction with the ore producing water and carbon dioxide by the combination of the oxygen from the ore with the hydrogen and carbon monoxide, respectively, of the gas.

When the reduction of the ore is complete to the extent permitted by the temperature prevailing, the flow of hydrogen is stopped and the temperature regulated to between 220° C. and 300° C., the ore now being in the highly active state required for treatment of the material to be improved. This material in fluid form is now passed through the ore, and the improved condition of the material is indicated by the following analysis of samples of different carbon compounds undergoing treatment.

Coal gas: Before treatment a sample of this gas was found to contain organically combined sulphur in the amount of 18 grams in 100 cubic meters, naphthalin 45 grams in 1 cubic meter, carbon monoxide 15%, and liquid hydrocarbons 22 grams. At the conclusion of the process the gas was found to contain sulphur 2 grams, naphthalin 15 grams, carbon monoxide 2.5%, and liquid hydrocarbons 33.6 grams. Of the crude benzol obtained from the gas before treatment, 3% dissolved in sodium hydroxide and about 12% in sulphuric acid. The benzol was further characterized by a disagreeable odor and a yellow color which darkened on exposure to light. After treatment, the same material was found to be insoluble in sodium hydroxide, and only 1% soluble in sulphuric acid. It was furthermore found that the disagreeable odor was entirely removed, the material being in the form of a colorless liquid which would not darken on exposure to light; no sulphur was found. The hydrogen cyanide originally contained in the coal gas disappeared completely, and the amount of ammonia increased by 10%.

Water gas: The application of the present process to the treatment of one cubic meter of water gas produced over 10 grams of light liquid hydrocarbons of benzine character and of absolute purity.

Brown coal gas, gas from shale: Treatment of gas of this character, which contained as much as 22% hydrogen sulphide and a large quantity of organically combined sulphur, resulted in desulphurization (removal of the organically combined sulphur) to such an extent that the gas was found to be suitable for use for general illuminating purposes. It will of course be understood that the gas was subjected to a preliminary treatment to effect removal of the hydrogen sulphide. The oils contained in these gases originally yielded sulphur in amounts as high as 11%; the solubility in sodium hydroxide and sulphuric acid was 11% and 25% respectively. After undergoing treatment, the amount of sulphur was found to be less than 0.1%; the solubility in sulphuric acid was less than 2%, and they were insoluble in sodium hydroxide. Changes in the odor and color similar to those obtained in the treatment of coal gas were noted.

Mineral oils, i. e., oils obtained in the liquid state direct from the earth: Gasoline, kerosene, and heavier fractions were similarly treated with the result that the sulphur content was reduced to less than 0.1%; the disagreeable odor was removed, the solubility in sulphuric acid was reduced to a negligible quantity, and a clear, colorless liquid was obtained.

In the case of the treatment of cracked gasoline, the results were similar to those above mentioned but were even more striking, the solubility in sulphuric acid of this material being reduced from 30% to an infinitesimal quantity. The color was entirely removed, and the disagreeable odor was eliminated, the treated product having the odor of natural gasoline. It was furthermore found that the resulting gasoline is more completely combustible and that no noxious fumes are produced by using the material as fuel in an internal combustion engine.

While oils may be treated in accordance with this process together with the gases from which they are produced, it will be understood that they may first be separated from the gases and the resulting products separately treated. It will be further apparent to those skilled in the art that in some instances the inclusion of hydrogen or hydrogen-carrying gases with the material undergoing treatment may be advisable in order to obtain certain desired reactions.

It is to be understood that the process is not entirely dependent on the use of any specific ore for successful operation, the specific example given above in which the use of minette is mentioned serving to illustrate a preferred process only. For instance, various other metallic ores may be used, such as copper or nickel, and various forms of iron ore other than limonitic ore, such as hematite or magnetite will serve to carry out the purpose of the present invention. It will thus be apparent that the process outlined herein is applicable to the general improvement of fluid carbon compounds including mineral oils, oils produced directly from the earth, and gases and oils produced by the carbonization or pyro-dissociation of carbonaceous or bituminous material, and is not restricted to the treatment of any particular type of fluid carbon compound or to the use of any specific metal in carrying out the process, but is to be broadly construed within the scope of the appended claims.

Having thus described the invention, what is claimed as new and desired to be secured by Letters Patent is:

1. A process for treating low boiling hydrocarbons which comprises conducting the same over minette which has been freshly reduced in an atmosphere containing free hydrogen.

2. A process for treating low boiling hydrocarbons which comprises conducting the same at an elevated temperature over minette which has been freshly reduced in an atmosphere containing free hydrogen.

3. A process for treating low boiling hydrocarbons which comprises conducting the same over a porous ore in the pyrophorous state at an elevated temperature.

4. A process for treating low boiling hydrocarbons which comprises conducting the same together with hydrogen at an elevated temperature over minette which has been freshly reduced in an atmosphere containing free hydrogen.

In testimony whereof I hereunto affix my signature.

HELIODOR ROSTIN.